United States Patent
Brumfield (10) Patent No.: US 6,574,957 B2
(45) Date of Patent: Jun. 10, 2003

(54) TIDAL/WAVE COMPRESSED AIR ELECTRICITY GENERATION

(76) Inventor: Donald U. Brumfield, 6206 Cahalan Ave., San Jose, CA (US) 95123

( * ) Notice: Subject to any disclaimer, the term of this patent is extended or adjusted under 35 U.S.C. 154(b) by 0 days.

(21) Appl. No.: 10/138,774

(22) Filed: May 3, 2002

(65) Prior Publication Data

US 2002/0162326 A1 Nov. 7, 2002

Related U.S. Application Data

(60) Provisional application No. 60/289,003, filed on May 4, 2001.

(51) Int. Cl.[7] .............................................. F03C 1/00
(52) U.S. Cl. .......................................... 60/398; 60/497
(58) Field of Search ..................... 60/398, 495, 497, 60/506; 290/53; 417/330, 331, 332

(56) References Cited

U.S. PATENT DOCUMENTS

| | | | |
|---|---|---|---|
| 138,474 A | | 5/1873 | Buckner |
| 738,996 A | * | 9/1903 | Hagen .......................... 60/398 |
| 888,721 A | * | 5/1908 | Milbury ...................... 417/332 |
| 1,555,487 A | * | 9/1925 | Sauer et al. ................. 417/331 |
| 3,151,250 A | | 9/1964 | Carlson ........................ 290/52 |
| 3,925,986 A | | 12/1975 | Barwick ....................... 60/398 |
| 4,009,395 A | | 2/1977 | Long et al. .................... 290/53 |
| 4,271,668 A | | 6/1981 | McCormick ................. 60/398 |
| 4,281,257 A | | 7/1981 | Testa et al. .................... 29/42 |
| 4,286,347 A | | 9/1981 | Modisette ...................... 9/8 R |
| 4,453,894 A | | 6/1984 | Ferone et al. ................ 417/332 |
| 4,454,429 A | | 6/1984 | Buonome ..................... 290/53 |
| 4,560,884 A | * | 12/1985 | Whittecar .................... 417/330 |
| 4,564,312 A | | 1/1986 | Munoz Saiz ................. 405/76 |
| 4,843,250 A | | 6/1989 | Stupakis ....................... 290/53 |
| 5,005,357 A | | 4/1991 | Fox .............................. 60/398 |
| 5,052,902 A | | 10/1991 | Labrador .................... 417/330 |
| 5,186,822 A | | 2/1993 | Tzong et al. ................ 210/122 |
| 5,575,587 A | | 11/1996 | Chen ........................... 405/76 |
| 5,770,893 A | | 6/1998 | Youlton ........................ 290/53 |
| 6,216,455 B1 | | 4/2001 | Doleh et al. ................. 60/398 |
| 6,269,636 B1 | * | 8/2001 | Hatzilakos ................... 60/398 |

OTHER PUBLICATIONS

Website printout, "Simple Machines", University of Arkansas—AgriScience Project, Info. sheet, 9 pages.

* cited by examiner

Primary Examiner—Edward K. Look
Assistant Examiner—Thomas E. Lazo
(74) Attorney, Agent, or Firm—Thomas Schneck; Gina McCarthy (57) ABSTRACT

A system for using tidal or wave action to compress air at a high pressure and produce electricity. The system includes a piston contained in a chamber including an air intake port. The chamber is connected to an air storage tank through a valve. A moveable power transfer shaft contained in a sleeve guide has a float disposed on ocean waves providing motion to the shaft. A lever arm is contacted by the power transfer shaft at one end and is connected to the piston at another end. As the power transfer shaft is upwardly displaced by the float, so is the lever arm at one end causing the piston to compress air within the chamber at another end. When a dual piston embodiment is employed, air is compressed upon upward and downward movement of the power transfer shaft. In an alternative embodiment, a gear mechanism is employed to transfer the linear movement of the power transfer shaft to the pistons. In both the lever and the gear embodiments, the air is compressed and stored at a high pressure in a storage tank. The compressed air is transferred from the storage tank and to a turbine or other mechanism where electricity is generated.

47 Claims, 6 Drawing Sheets

TIDAL/WAVE COMPRESSED AIR ELECTRICITY GENERATION

CROSS-REFERENCE TO RELATED APPLICATIONS

This application claims the benefit and priority of U.S. Provisional Application No. 60/289,003, filed May 4, 2001, which is herein incorporated by reference.

TECHNICAL FIELD

The invention relates generally to the conversion of energy from tidal and wave action to electricity and more particularly to a system utilizing energy from wave or tidal action to compress and store air at a high pressure to be used for generating electricity.

BACKGROUND ART

It has long been recognized that water waves provide a valuable, non-polluting energy source. Therefore, various forms of methods and devices have been developed for the generation of power from tidal or wave action.

One such power generation device is shown and described in U.S. Pat. No. 6,216,455 entitled "Apparatus for Conversion of Energy from the Vertical Movement of Seawater" issued to Dolch et al. The apparatus comprises a hollow body situated substantially upright on the sea bottom having at least one aperture within a wall thereof. Water moves into and out of the hollow body. The apparatus also includes a floating body being movable in a vertical direction with respect to the hollow body by the movement of the seawater level. The floating body is in communication with space in the hollow body through a cap. As the floating body moves upward the cap moves upward. As the cap moves, air is compressed and stretched causing water to oscillate in the hollow body. A fluid flow is created inside the hollow body and is used to drive a propeller being connected to an energy generator.

Another such system is disclosed in U.S. Pat. No. 4,564,312 to Saiz entitled, "System for Utilizing the Energy of Waves." The system comprises a wall having a plurality of compartments separated by partitions. The water of a wave enters the compartments and forces air in that compartment through a conduit. Air in the conduit moves past a non-return valve and into a storage tank. The compressed air in the storage tank is transferred to a turbine to generate electricity.

It is an object of the invention to provide a new and improved system for utilizing wave or tidal action for generation of electrical power.

It is another object of the present invention to provide a system for utilizing wave or tidal action for the generation of high-pressure air.

SUMMARY OF THE INVENTION

The foregoing and other objects of the invention are accomplished by providing a system that utilizes a movable power shaft located in a wave/water environment to transfer the energy of tidal or wave action to a piston contained in a chamber including a one-way air intake port, located in a non-wave environment. The moveable power transfer shaft is contained in a sleeve guide and is in a contact relation with a float disposed on ocean or sea waves providing motion to the shaft. A lever arm is contacted by the power transfer shaft at one end and is connected to the piston at another end. As the power transfer shaft is upwardly displaced by the float, so is the lever arm at one end. Another end of the lever arm moves downwardly causing the piston to compress air within the piston chamber.

In one embodiment a second piston is utilized. As the power transfer shaft is displaced downwardly, upon retreat of water or waves, so is the end of the lever arm nearest the power transfer shaft. Another end of the lever arm is displaced upwardly causing the second piston to compress air within the piston chamber.

The power transfer shaft includes an outwardly biased actuator arm that is pivotally connected to the power transfer shaft. As the power transfer shaft is pushed upwardly by the float and through the sleeve guide, the actuator arm pivots outwardly and makes contact with the lever arm, thereby pushing the lever arm upwards. At the other end the lever arm is pushed downwardly, with mechanical advantage, and exerts a force on the piston compressing air present within the piston chamber. The chamber is connected to an air storage tank through a valve. The compressed air in the chamber travels from the chamber through a valve to the air storage tank. From the air storage tank, the air stored at a high pressure is transferred to a turbine or other mechanism where electricity is generated.

When a second piston is used, so is a second outwardly biased actuator arm. As the power transfer shaft moves downwardly, the second outwardly biased arm contacts the lever arm urging it downwards at an end nearest the power shaft and upward at another end connected to the second piston. The end nearest the second piston produces an upward force on the second piston, compressing air present within the piston chamber. As stated above, with regard to the first piston, the compressed air is stored in a storage tank and is transferred to a turbine where electricity is generated.

In an alternative embodiment, a gear mechanism, instead of the lever, is employed to transfer the movement energy of the power transfer shaft to the piston. In the gear mechanism, the power transfer shaft includes a rack that engages with the teeth of a larger gear upon upward and downward movement of the power transfer shaft, causing the larger gear to rotate. The larger gear is in meshing engagement with a smaller gear including a centered crankshaft with off center crankshaft sections on either side of the smaller gear. Each crankshaft is connected to a piston rod compressing air within a piston chamber upon upward or downward movement of the power transfer shaft. The compressed air is stored and used to create electricity.

An advantage of the lever and gear embodiments is that high-pressure air is provided as an energy supply. High-pressure air is a valuable source of energy. A further advantage is that the high-pressure air is provided without needing to consume a natural resource or an electrically driven source of power, as both embodiments utilize a mechanical advantage to compress the air. In contrast, prior art systems that utilize wave or tidal action to generate electricity, use electricity or a natural resource to compress the air at a high pressure.

BEST MODE FOR CARRYING OUT THE INVENTION

Figure 1:
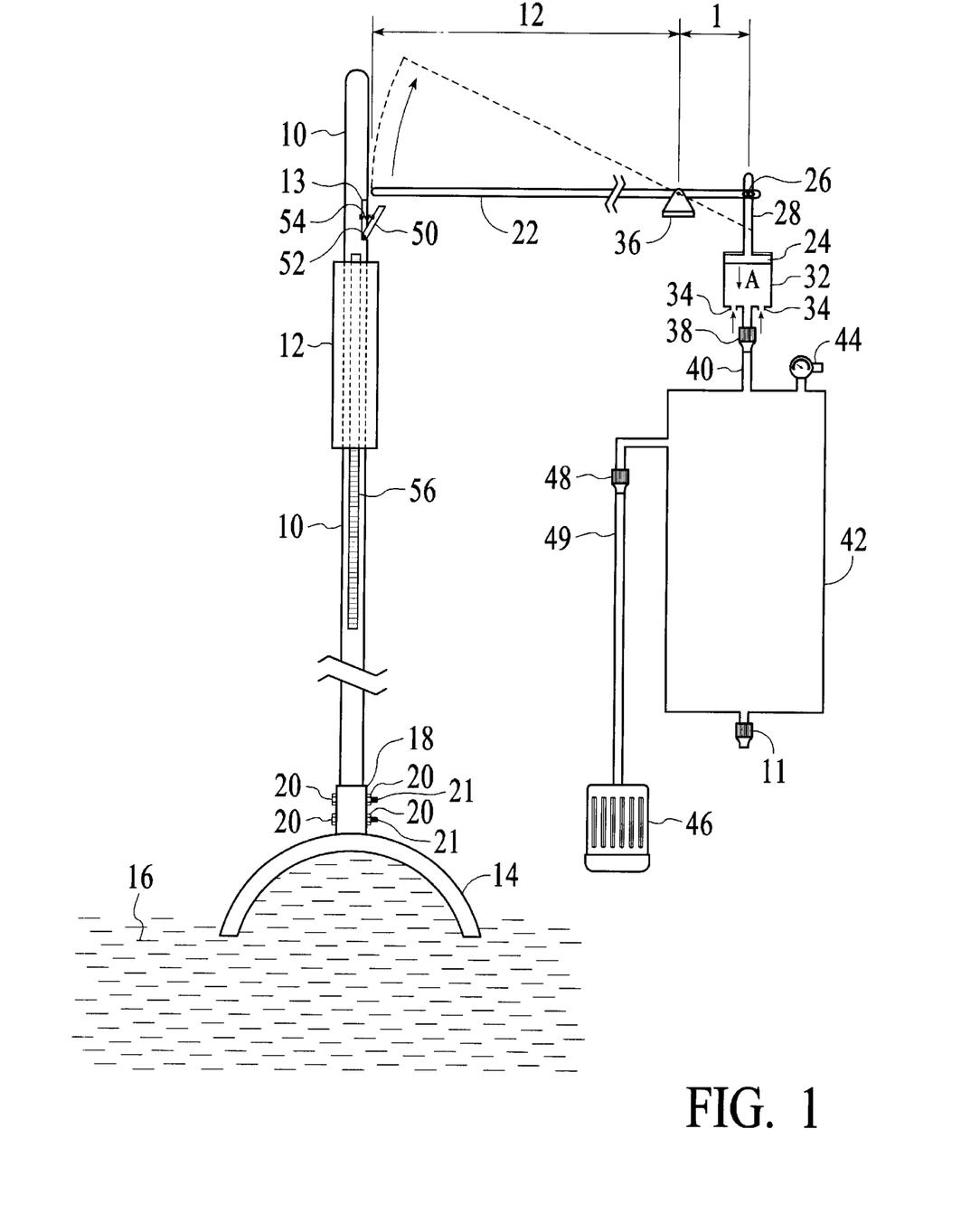
FIG. 1 is a plan view of an embodiment of the present invention featuring a power transfer shaft and a lever.

With reference to FIG. 1 there is seen a first embodiment of the present invention featuring an upwardly and downwardly moveable power transfer shaft 10 contained in a sleeve guide 12. The shaft 10 is connected to or in a contact relation with a float 14, which is provided with motion by ocean or sea waves 16. As will be described below, the float 14 is for example, built on a shoreline where waves are channeled to it. The float 14 is buoyant and rises and lowers in a vertical direction with the tidal and wave motion. It is pictured as being concave and hollow however, a variety of shapes of floats may be used including floats that are solid. The float 14 includes a collar 18 within which the power transfer shaft 10 is attached. Nuts 20 and bolts 21 are disposed through the collar 18, securing the power transfer shaft 10 to the collar 18.

A lever arm 22 is contacted by the power transfer shaft 10 at one end and is connected to a piston rod 28 at a connector 26, which is for example a screw. Through the lever 22, a mechanical advantage is obtained as will be described below. The piston 24 is connected to piston rod 28 and is contained in a piston chamber 32, including at least one one-way air intake port 34 to allow for the intake of air into the chamber 32. Two intake ports 34 are pictured here. The piston 24 and chamber 32 are located in, for example, a non-wave environment.

The float 14, displaced by tidal or wave action, causes the power transfer shaft 10 to be upwardly displaced. In one example, the power transfer shaft 10 is disposed beneath the lever 22 to make contact with the lever upon upward movement. The power transfer shaft 10 causes upward displacement of the lever arm 22 at an end of the lever arm nearest the power transfer shaft 10 and downward displacement of the lever arm at an end connected to the piston 24 through piston rod 28. The lever 22 pivots about a stationary pivot fulcrum 36 during displacement. The downward displacement of the lever arm 22 at one end causes the piston rod 28 to move downwardly, exerting a force on the piston 24 causing the piston to compress, with a high force, air within the piston chamber 32 in a downward direction A. Air is compressed with the downward stroke of the piston 24.

Figure 2:
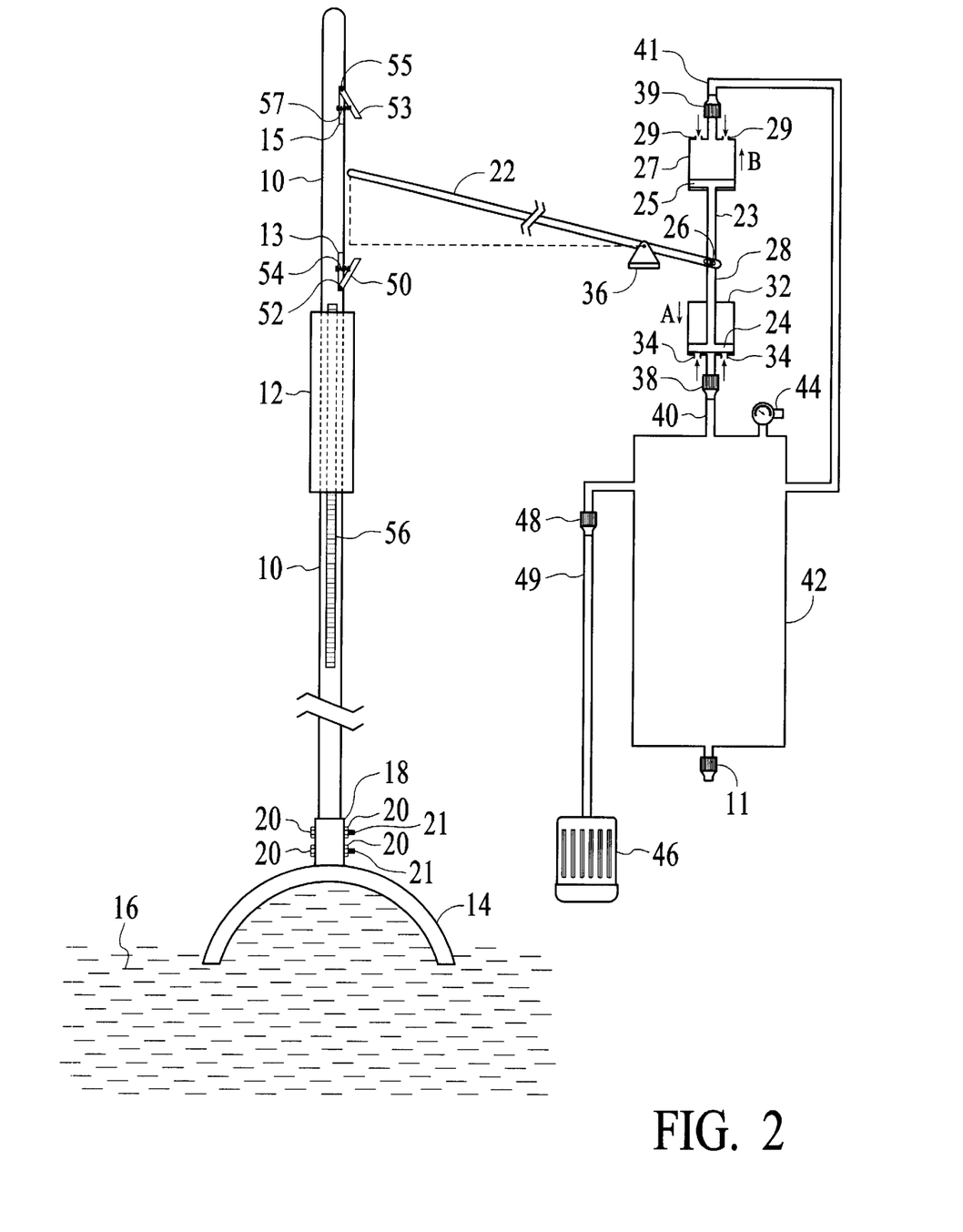
FIG. 2 is a plan view of another embodiment of the invention pictured in FIG. 1, featuring an additional actuator arm and piston.

With reference to FIG. 2, a two-piston embodiment is seen. Here, another piston 25 compresses air with an upward stroke. As the wave or tide 16 retreats, the power transfer shaft 10 moves downwardly. As power transfer shaft 10 moves downwardly, it contacts lever 22 and urges it in a downwardly direction on the end nearest the power transfer shaft 10 and in an upwardly direction at the connector end 26. The connector end 26 of lever 22 is connected to a second piston rod 23 that urges piston 25 upwardly in the direction labeled with the arrow B, causing it to compress air within the piston chamber 27. Piston rods 23 and 28 may be a single rod or alternatively may be separate rods. As air is compressed in piston chamber 27 it is drawn in through one-way air intake port or ports 34 into chamber 32. Conversely, as air is compressed within piston chamber 32, it is drawn into piston chamber 27 through one-way air intake port or ports 29. The compressed air in the chambers 27 and 32 travels from the chambers through air release valves 38 and 39 and conduits or tubing 40 and 41 connected to an air storage tank 42, where it is stored. An air pressure safety valve 44 allows adjustability of the pressure of the air within the storage tank 42 if desired. A condensation release valve 11 may also be present. The stored air then exits the storage tank 42 and enters a turbine 46 or other electricity generator in communication with the storage tank's air release valve 48, whereby the compressed air generates electricity using methods known in the art. The air storage tank 42, turbine 46 and associated elements are, for example, located in a non-wave environment. Alternatively, each of the piston chambers 27 and 32 may be connected to their own storage tanks or turbines.

Figure 3A:
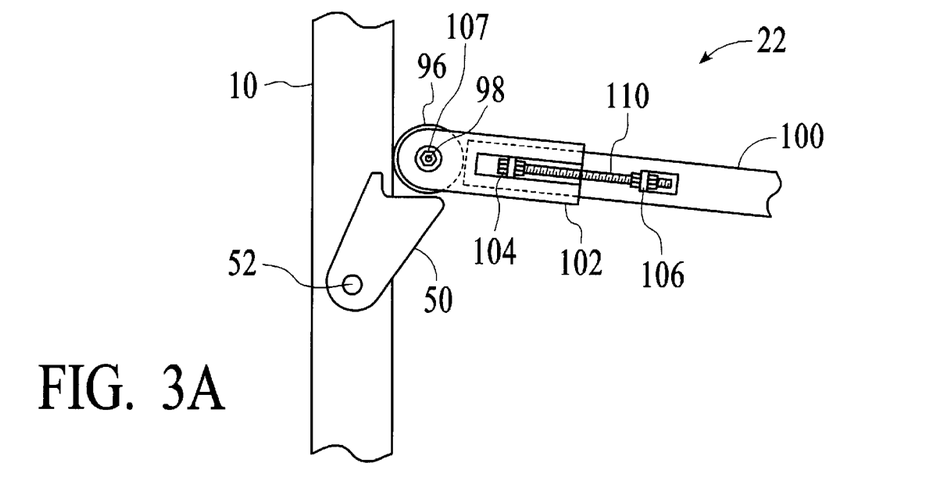
FIG. 3A is a side view of another embodiment of the invention pictured in FIG. 1, featuring a lever having a wheel and an adjustable sleeve.

Details of the power transfer shaft 10 are seen in FIGS. 1–3. In the one piston embodiment, shown in FIG. 1, the power transfer shaft 10 includes an actuator arm 50 that makes contact with the lever arm 22. As seen in FIG. 3A, the actuator arm 50 is pivotally connected through pivot 52 to the power transfer shaft 10. An arm 13 may be attached to shaft 10. Alternatively, arm 50 is pivotally connected to arm 13. As the power transfer shaft 10 extends upwardly from the sleeve guide 12 upon motion of the float 14, the actuator arm pivots 50 outwardly and makes contact with the lever arm 22 upwardly urging the lever arm. When the power transfer shaft 10 extends upwardly a certain distance, the actuator arm 50 no longer makes contact with the lever arm 22 (FIG. 2). The end of the lever arm 22 near the transfer shaft 10 moves upwardly and the end of the lever arm 22 nearest connector 26 moves downwardly, while pivoting at the stationary pivot fulcrum 36. The piston rod 28 then urges the piston 24 in the downward direction A, compressing air. In one example, an outwardly biased positioning pressure spring 54 (FIG. 1) is connected to the actuator arm 50, assisting the actuator arm 50 in its outward movement, by urging it outwardly. Alternatively or additionally, the spring is connected to power transfer shaft 10 or arm 13.

In the two piston embodiment, seen in FIG. 2, the power transfer shaft 10 includes a second actuator arm 53 that makes contact with the lever arm 22 when the end of the lever arm nearest the power transfer shaft 10 is in an upward position. The actuator arm 53 is pivotally connected through pivot 55 to the power transfer shaft 10. An arm 15 may be attached to shaft 10. Alternatively, arm 53 is pivotally connected to arm 15. Pivot 55 is located at an upper end of the arm 53. In one example, arm 53 is an upside down version of arm 50. The power transfer shaft 10 extends downwardly through the sleeve guide 12, upon downward motion of the float 14 due to retreat of waves 16. The actuator arm 53 pivots at pivot 55 outwardly and makes contact with the lever arm 22 urging it in a downward direction. The lever arm 22 is pushed downwardly at the end nearest the power transfer shaft 10 and upwardly at the end nearest the connector 26 attached to piston rod 23, while pivoting at the stationary pivot fulcrum 36. The piston rod 23 then urges the piston 25 in an upward direction B compressing air. In one example, an outwardly biased positioning pressure spring 57 (FIG. 1) is connected to the actuator arm 53 assisting the actuator arm 53 in its outward movement, by urging it outwardly. Alternatively or additionally, the spring is connected to power transfer shaft 10 or arm 15. With the two-piston embodiment, compressed air is generated upon introduction of waves 16 into and retreat of waves 16 from the float 14.

In one example, one or more guide splines 56, are affixed, such as by welding, to the power transfer shaft 10 to ensure that the shaft 10 stays in a position where the actuator arm 50 will be able to contact the lever arm 22 upon upward movement of the shaft and where the actuator arm 53 will be able to contact the lever arm 22 upon downward movement of the shaft, through the floatation device 14. The splines 56 can be attached to surfaces of the shaft 10 such as side surfaces.

The lever provides the system with a mechanical advantage. The mechanical advantage of the lever is the ratio of the length of the lever on the applied force side of the stationary pivot fulcrum (the side nearest the power transfer shaft 10) to the length of the lever on the resistance force side of the stationary pivot fulcrum (the side nearest the piston 24). The mechanical advantage of the lever pictured (though not to scale) is for example, 12:1, however, the mechanical advantage can vary with the desired output of force. In the example shown in FIG. 1, the length of the lever on applied force side is for example 12 feet and the length of the lever on the resistance force side is 1 foot. The further away from the stationary pivot fulcrum 36 the effort is applied, the less force needed to move the load. In this case the load includes the piston 24 and the air within the chamber 32 which the piston compresses or the piston 25 and the air within the chamber 27 which the air compresses. In the system pictured in FIG. 1, the power transfer shaft 10 supplies the effort as it is displaced upwardly. In the system picture in FIG. 2, the power transfer shaft supplies the effort as it is displaced upwardly and downwardly.

In one example, with a mechanical advantage of 12:1, a force of 144 pounds is applied to the piston 24 when 12 pounds of effort is exerted on the force side of the lever arm 22. As pressure is equal to force per unit area, the stronger the force applied to the piston 24 or 25 which compresses the air within the chamber 32 or 27, the greater the pressure within the pressure chamber 32 or 37 and air storage tank 42. A mechanical advantage can result in air being stored at a desired pressure within the air storage tank 42. For example, with a mechanical advantage of 12:1 air can be stored at around 600 PSI within the air storage tank 42. The system of the present invention is advantageous in that it compresses air and stores the compressed air at a high pressure without consuming a natural resource or an electrically driven source of power. Instead the system utilizes a mechanical advantage of the lever to compress the air.

Figure 4:
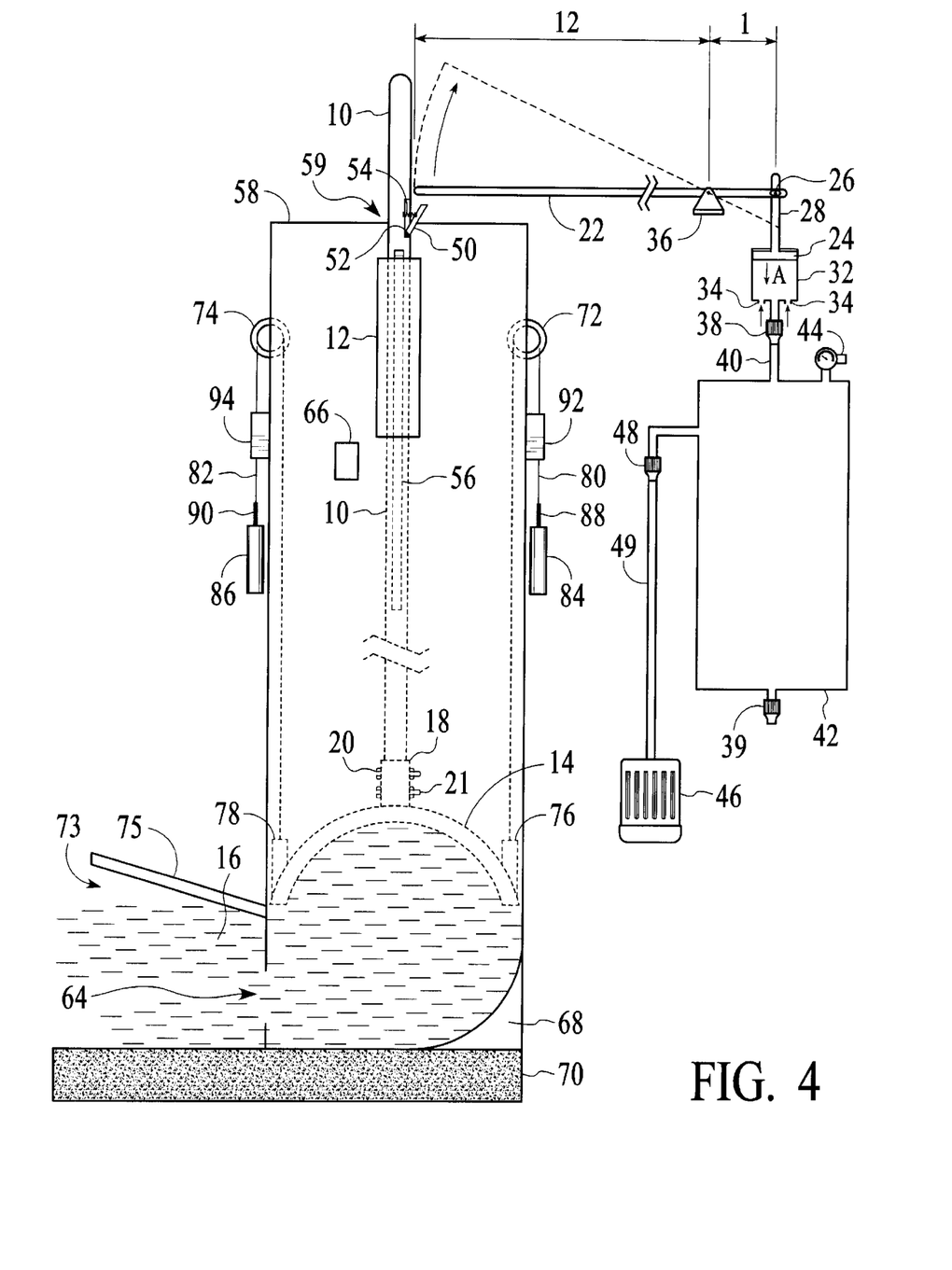
FIG. 4 is a plan view of another embodiment of the invention pictured in FIG. 1, featuring a hollow body.

With reference to FIG. 4, it is seen that the float 14, power transfer shaft 10 and sleeve guide 12 can be contained within a hollow body 58. The body comprises, for example, a 12 gauge metal corrugated pipe. The body protects the float 14, power transfer shaft 10, sleeve guide 12 and any other elements contained within the body 58 from corrosion. The power transfer shaft 10 emerges from and retracts within an upper opening 59 of the pipe body 58 upon upward movement of the float 14. The body 58 is built stationary at, for example, a shoreline where it rests. In one example, the body 58 is attached or connected to a concrete base 70, which rests upon the shoreline. The concrete base 70 may be integral with or attached to a wall 75 of a hollow channel 73. Alternatively, the wall 75 may be attached or connected to the body 58. The channel 73 extends into the ocean, sea or other source of waves for any desired distance. Water 16, in particular waves, enters the channel 73 and is channeled into at least one opening 64 in the body. Water is able to enter and exit the body 58 through the opening 64. Upon entering the body 58, water pushes up against the float 14 causing the upward movement of the float 14 and the power transfer shaft 10. Upon exiting the body 58, water retreats causing the downward movement of the float 14 and power transfer shaft 10. One or more openings 66 may be present in a portion of the hollow body 58 located above the float 14, to release water or air within the body 58. In one embodiment, the bottom of the body 58 includes a water ramp 68. The force provided by the waves of the ocean may be increased as the waves travel up the ramp 68.

Another embodiment of the present invention is useful for assisting in maintaining the float at a desired level within the body 58. First and second grooved cable wheels 72 and 74 are connected at opposing ends of the hollow body 58 through links 76 and 78. The first cable wheel 72 includes a cable 80 and the second cable wheel 74 includes a cable 82 disposed within the groove (not shown) of each wheel. Each cable has one end attached to the float 14 through the links for example, and another end attached to one of weights 84 and 86. The weights selected assist in balancing the float 14 at a desired location. Coil spring stops 88 and 90 are attached to the cables 80 and 82, respectively and provide a compliant stop to the movement of the weights 84 and 86 when either weight reaches its respective cable wheel or guide. Guides 92 and 94 are also attached to cables 80 and 82, respectively so that the cables and attached weights do not veer away from the hollow body 58. The guides may also be attached to the body 58.

Figure 3B:
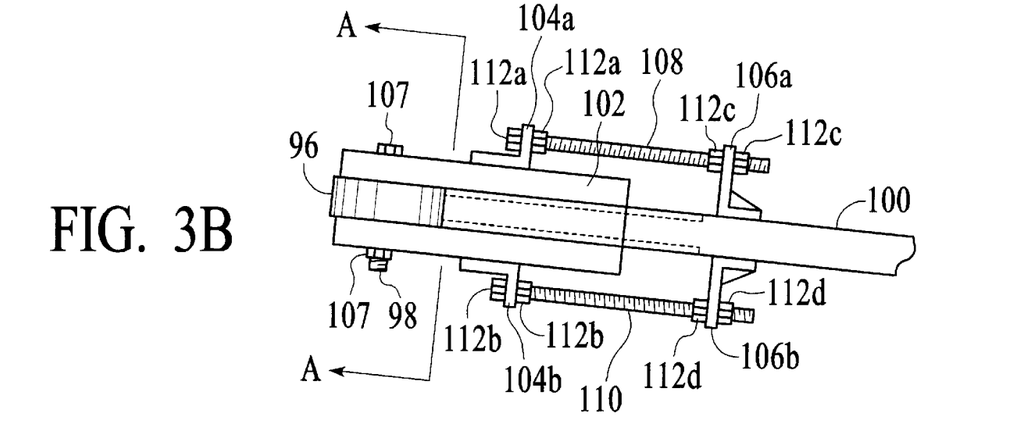
FIG. 3B is a partial top view of the embodiment pictured in FIG. 3A.

Referring back to FIGS. 3A–3C it is seen that, in one embodiment, the lever 22 includes a wheel 96 attached through a bolt 98 and nuts 107 to the end of the lever 22 nearest the power transfer shaft 10. As the power transfer shaft 10 moves upwardly and the actuator arm 50 makes contact with the wheel 96, the wheel 96 slides along the power transfer shaft 10 and the lever 22 is upwardly displaced. Conversely, though not shown, as the power transfer shaft 10 moves downwardly, the wheel 96 slides along the power shaft and the lever is downwardly displaced at a end closest to the power transfer shaft.

Figure 3C:
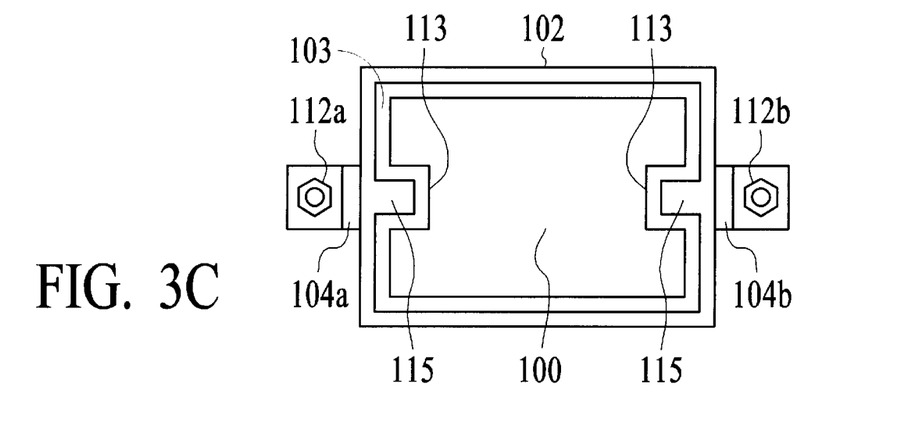
FIG. 3C is a sectional view of a portion of the embodiment picture in FIG. 3B taken along the lines A—A.

In one embodiment, the lever 22 further includes an arm 100 and an adjustable sleeve 102 within which the arm 100 is received. In one example, wheel 96 is associated with or connected to the sleeve through nuts 107 and bolt 98. An adjustment assembly is coupled to the lever 22 to assist in adjusting the length of the lever 22. The adjustment assembly includes a first and second pair of brackets 104 and 106 spaced apart from each other. The first pair of brackets 104 is connected to opposite sides of the sleeve 102 and the second pair of brackets 106 is connected to opposite sides of the arm 100. A bracket 104a, from the first pair of brackets 104, is connected to a bracket 106a, from the second pair of brackets 106, through an elongate member 108. A bracket 104b, from the first pair 104, is connected to a bracket 106b, from the second pair 106, through a second elongate member 110. Elongate members are, for example, retractable. The brackets 104 and 106 contain an opening (not shown) through which the elongate members 108 and 110 pass through to connect the brackets to each other. Nuts 112a–d attach the elongate members to the brackets. By loosening the nuts 112, moving the retractable sleeve 102 to the desired location, by either pushing it over the arm 100 away from the power shaft 10 or by pulling it from the arm 100 towards the power shaft 10, and securing the sleeve 102 to the desired location with the nuts 112, one can adjust the length of the lever 22. In FIG. 3C, it is seen that arm 100 may include a groove 113 through which a protrusion 115 on an inner surface of the sleeve 102 is insertable. A gap 103 may be present between protrusion 115 and groove 113.

Figure 5:
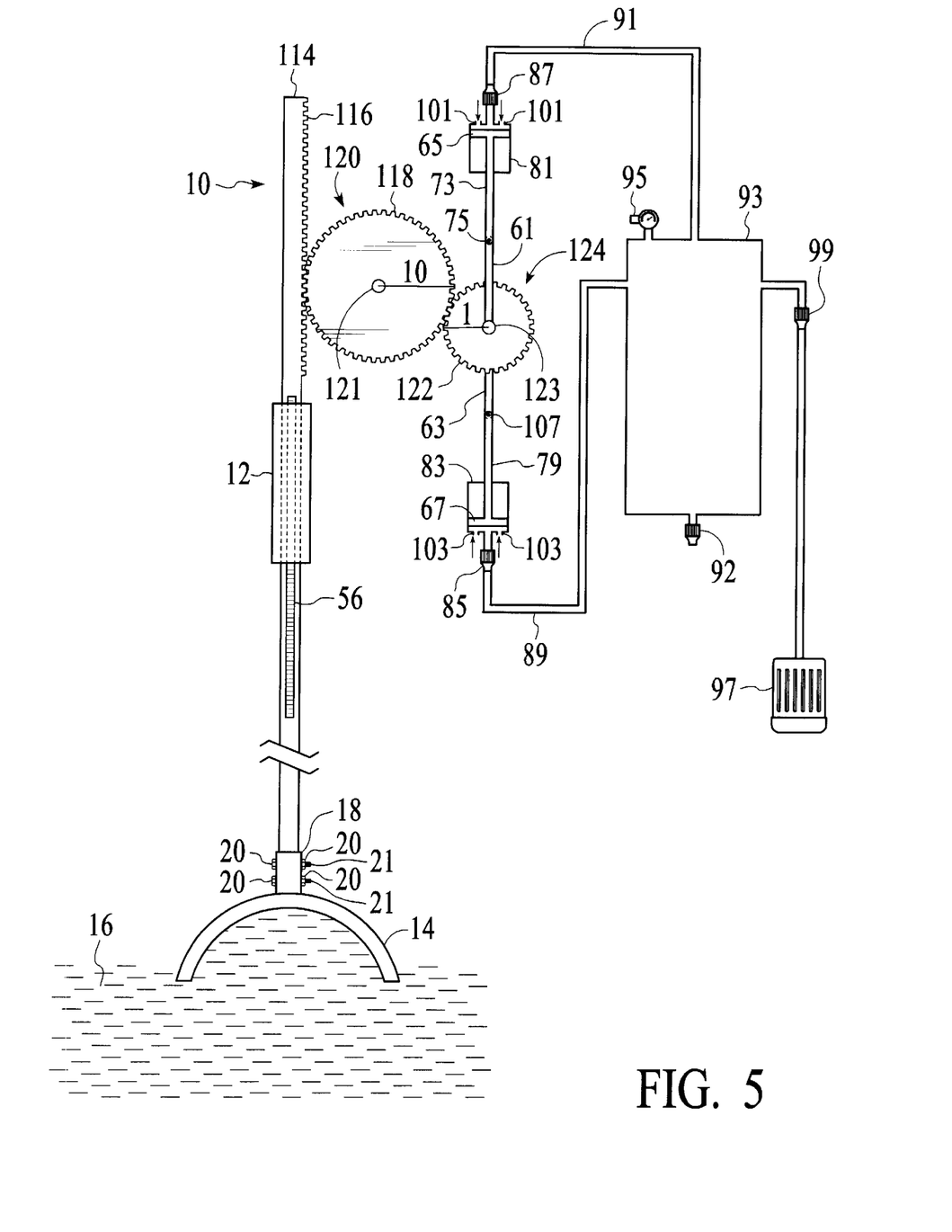
FIG. 5 is a front plan view of an alternative embodiment of the present invention, featuring a gear mechanism.
Figure 6:
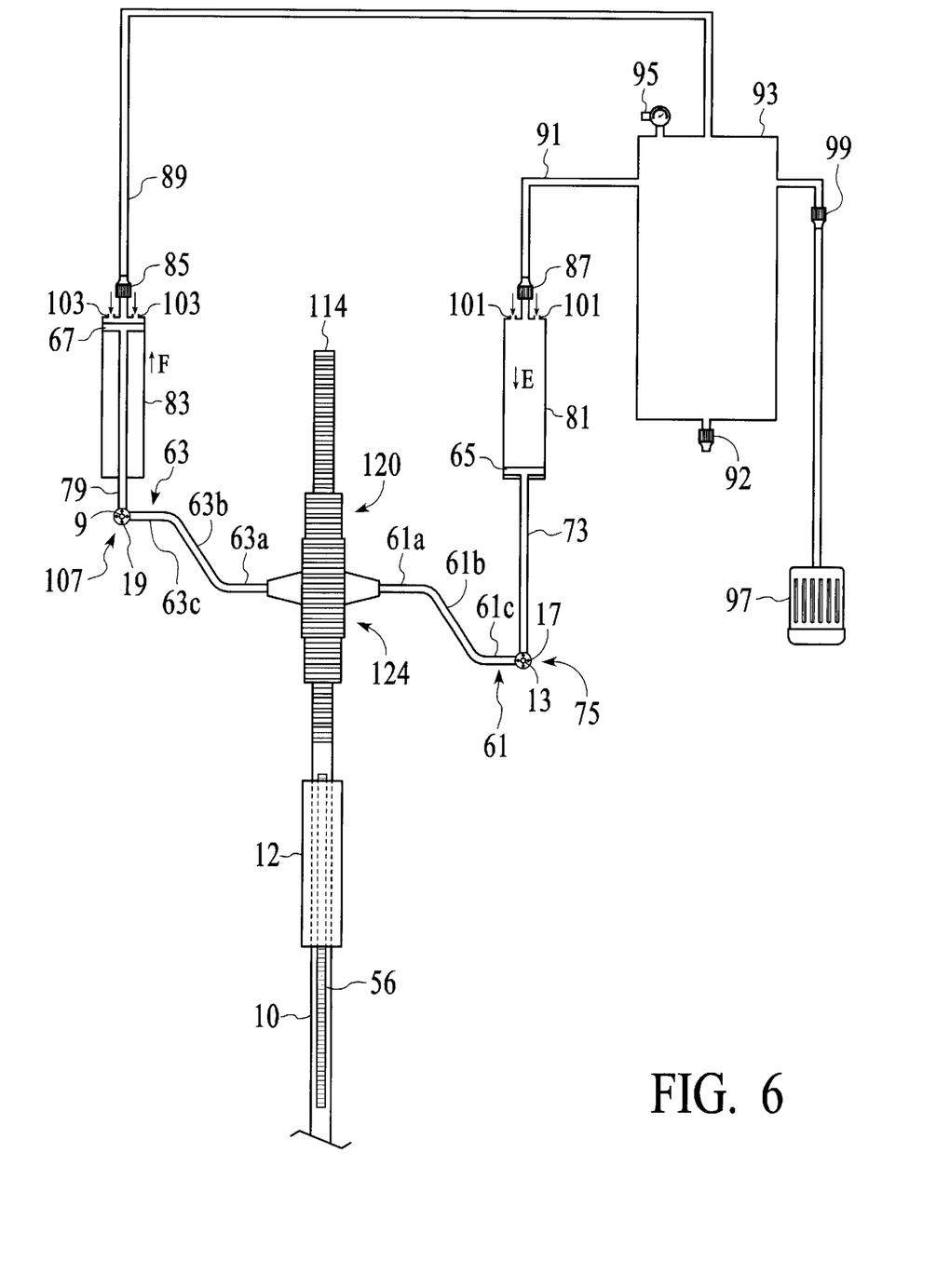
FIG. 6 is a partial side plan view of an alternative configuration of the gear embodiment of FIG. 5.

With reference to FIGS. 5 and 6, it is seen that a gear assembly including larger gear 120 and smaller gear 124 can be used in place of the lever 22 to provide a mechanical advantage to the system of the present invention. As stated above, the power transfer shaft 10 moves upwardly upon upward motion of the float 14 and moves downwardly upon downward motion of the float 14, due to the ingress or egress of tidal or wave action 16. Again, the float 14, connected to the shaft 10, is in a water environment.

In this embodiment, the power transfer shaft 10 includes a rack 114 having teeth 116 disposed on at least one side of the rack. The rack teeth 116 are of a size and configuration such that they are able to engage with teeth 118 disposed on the first gear 120. The larger gear 120 rotates in one direction upon contact with the upwardly moving rack 114. The rack teeth 116 engage the gear teeth 118 thereby converting the linear motion of the rack 114 into a circular motion of the gear 120 having a center 121. Gear teeth 118 are disposed in meshing engagement with teeth 122 disposed on a second pinion or gear 124, having a smaller diameter than the first gear 120. Gear 124 has a center 123. As the larger gear rotates, the smaller gear 124 rotates in, for example, the opposite direction, as the gear teeth are in meshing engagement. A pair of opposing crankshafts 61 and 63 is connected on either side of gear 127. In one embodiment, each crankshaft is connected to a center portion 123 of the gear 124. The crankshafts may include sections 61a–c and 63a–c, some of which are off center staggered sections which may be solid, if desired. Crankshafts 61 and 63 are connected to piston rods 73 and 79, respectively. Piston rod 73 is connected to piston 65, compressing air within piston chamber 81. Piston rod 79 is connected to piston 67 compressing air within chamber 83. The pistons 65 and 67 work, for example, in an opposing manner in opposing directions.

In operation, when the rack 114 is provided with upward motion through tidal or wave 16 action upon float 14, the rack causes gear 120 to rotate in one direction, causing gear 124 to rotate in another direction. Crankshaft 61 rotates as the.gear rotates. The rotational movement of the gear 124 may be converted to linear movement of the piston rod 73 at connector 75 through crankshaft 61. Connector 75 is for example a split bearing 13 with split race 17, as is known in an automotive assembly in the prior art. Piston rod 73 causes piston 65 to compress air within piston chamber 81. As air is being compressed within piston chamber 81, air is being drawn into piston chamber 83 through at least one one-way air intake port 103.

The rack 114 is provided with a downward motion through a subsiding of tidal or wave 16 action, causing gear 120 to rotate in another direction. Rotating gear 120 causes gear 124 to rotate in the opposite direction, causing crankshaft 63 to rotate. The rotational movement of the gear 124 may be converted to linear movement of the piston rod 79 at connector 107 through crankshaft 63. Connector 107 is for example, a split bearing 9 with split race 19, as is known in an automotive assembly in the prior art. Piston rod 79 causes piston 67 to compress air within chamber 83. In one example, shown in FIG. 5, as air is being compressed within piston chamber 83, air is being drawn into piston chamber 81 through at least one one-way air intake port 101 and the pistons compress air in opposite directions. In both lever and gear dual piston arrangements, when one piston is in a position in the chamber to compress air, the opposing piston may be in a position in the chamber where it has already compressed air, and vice versa. The arrangement of the pistons and piston chambers may be reversed or configured in any desirable manner. In FIG. 6, it is seen that pistons 65 and 67 both compress air when moving in the upward direction indicated by arrow F. In the embodiment in FIG. 6, air has been compressed within chamber 83 and is ready to be compressed within chamber 81. In the FIG. 6 embodiment, piston 65 moves in the downward direction of arrow E when piston 67 moves in the upward direction F and vice-versa.

The compressed air in the chambers 81 and 83 travels from the chambers through a valve 85 or 87 and through a conduit or tubing 89 or 91 to a connected air storage tank 93, where it is stored. An air pressure safety valve 95 allows adjustability of the pressure of the air within the storage tank 93, if desired. Condensation release valve 92 may also be present. The stored air then exits the storage tank 93 and enters a turbine 97, or other electricity generator, in communication with the storage tank's air release valve 99, whereby the compressed air generates electricity. The air storage tank 93, turbine 97 and associated piston elements are, for example, located in a non-wave environment. Alternatively, tubing 89 may be connected to another air storage tank and turbine.

With the gear embodiment, both upward and downward movement of the power shaft 10 upon advancement and retreat of water 16, allows for compression of air.

As with the lever mechanism, the gear mechanism provides a mechanical advantage to the system. For example, with reference to FIG. 5, the gear may provide a 10:1 mechanical advantage (not shown to scale) when the radius of the first gear is ten times the length of the radius of the second gear. In other words, the drive gear or the first gear 120 turns once for every 10 turns of the second smaller gear 124. The faster the second gear 124 rotates, the faster the stroke of pistons 65 and 67 in the chambers 81 and 83 compresses air in the chambers 81 and 83 for storage in the air storage tank 93. As with the lever embodiment of the invention, the mechanical advantage of the gear mechanism can vary as desired.

Additionally, the power transfer shaft 10, sleeve guide 12 and float 14 of the embodiment incorporating either of the gear mechanisms may be contained within the hollow body 58 as described above with regard to FIG. 2.

What is claimed is:

1. A system for using wave energy to compress air and produce electricity, said system comprising:
    a) an upwardly and downwardly movable power transfer shaft contained in a sleeve guide, said shaft connected to a float disposed on waves providing motion to the shaft;
    b) a piston contained in a chamber having one or more one-way air intake ports;
    c) a pivotally mounted lever connected at a first end to the piston and at an opposite end in contact relation with the power transfer shaft, with movement of the power transfer shaft causing the piston to compress air, wherein the power transfer shaft further includes an actuator arm in upwardly urging contact with said opposite end of said lever upon upward movement of said power transfer shaft, said actuator arm in upwardly urging contact causing downward movement of said first end of said lever, said downwardly moving lever end causing said piston to compress air within said chamber;
    d) a compressed air storage tank connected to the piston chamber by a one-way air valve through which compressed air enters the storage tank, said storage tank also having an air release valve; and
    e) a turbine in communication with the storage tank's air release valve, whereby the compressed air exits the storage tank and enters the turbine through the air release valve, generating electricity.

2. The system of claim 1 wherein said lever pivots about a stationary pivot fulcrum.

3. The system of claim 2 wherein said stationary pivot fulcrum is located nearest to said piston.

4. The system of claim 1 wherein said lever has a mechanical advantage of about 12:1.

5. The system of claim 1 wherein said actuator arm is pivotally connected at one end to said power transfer shaft and makes contact at another end with said lever upon upward movement of said power transfer shaft.

6. The system of claim 5 further comprising a pressure spring outwardly biased and in outwardly urging contact with said actuator arm.

7. The system of claim 1 further comprising a second actuator arm and a second opposed piston contained within a second piston chamber wherein said second actuator arm is disposed above said first actuator arm and upon downward movement of said power transfer shaft said second actuator arm is in downwardly urging contact with said lever at one end of said lever, causing another end of said lever to move upwardly thus causing said second piston to compress air within said second piston chamber.

8. The system of claim 7 further comprising a second pressure spring outwardly biased and in outwardly urging contact with said second actuator arm.

9. The system of claim 1 wherein said float is concave.
10. The system of claim 1 wherein said float is hollow.
11. The system of claim 1 wherein said float is plastic.
12. The system of claim 1 wherein said float is buoyant.
13. A system for using wave energy to compress air and produce electricity, said system comprising:
 a) an upwardly and downwardly movable power transfer shaft contained in a sleeve guide, said shaft connected to a float disposed on waves providing motion to the shaft;
 b) a piston contained in a chamber having one or more one-way air intake ports;
 c) a pivotally mounted lever connected at a first end to the piston and at an opposite end in contact relation with the power transfer shaft, with movement of the power transfer shaft causing the piston to compress air wherein said lever includes an adjustable sleeve and an arm, said adjustable sleeve receiving said arm;
 d) a compressed air storage tank connected to the piston chamber by a one-way air valve through which compressed air enters the storage tank, said storage tank also having an air release valve; and
 e) a turbine in communication with the storage tank's air release valve, whereby the compressed air exits the storage tank and enters the turbine through the air release valve, generating electricity.

14. The system of claim 13 further comprising a first and second pair of brackets spaced apart from each other, said first pair of brackets connected to opposite sides of said adjustable sleeve and said second pair of brackets connected to opposite sides of said arm, both pairs of brackets having an opening wherein one of said first bracket pair is connected to one of said second bracket pair on one side of said lever and another of said first bracket pair is connected to another of said second bracket pair on another side of said lever through a pair of elongate members received within said bracket openings.

15. The system of claim 14 further comprising bolts securing said elongate members to said brackets.

16. The system of claim 13 further comprising a wheel associated with said sleeve of said lever, wherein said wheel slides along said power transfer shaft upon movement of said power transfer shaft.

17. The system of claim 16 wherein said wheel is disposed on an end of said sleeve nearest said power transfer shaft.

18. The system of claim 13 wherein said lever pivots about a stationary pivot fulcrum.

19. The system of claim 13 wherein said stationary pivot fulcrum is located nearest to said piston.

20. The system of claim 13 wherein said lever has a mechanical advantage of about 12:1.

21. The system of claim 13 wherein said float is concave.
22. The system of claim 13 wherein said float is hollow.
23. The system of claim 13 wherein said float is plastic.
24. The system of claim 13 wherein said float is buoyant.
25. A system for using wave energy to compress air and produce electricity, said system comprising:
 a) an upwardly and downwardly movable power transfer shaft contained in a sleeve guide, said shaft connected to a float disposed on waves providing motion to the shaft;
 b) a collar attached to a top surface of said float, said power transfer shaft attached to said collar at a lower end of said shaft;
 c) a piston contained in a chamber having one or more one-way air intake ports;
 d) a pivotally mounted lever connected at a first end to the piston and at an opposite end in contact relation with the power transfer shaft, with movement of the power transfer shaft causing the piston to compress air;
 e) a compressed air storage tank connected to the piston chamber by a one-way air valve through which compressed air enters the storage tank, said storage tank also having an air release valve; and
 f) a turbine in communication with the storage tank's air release valve, whereby the compressed air exits the storage tank and enters the turbine through the air release valve, generating electricity.

26. The system of claim 25 wherein said lever pivots about a stationary pivot fulcrum.

27. The system of claim 25 wherein said stationary pivot fulcrum is located nearest to said piston.

28. The system of claim 25 wherein said lever has a mechanical advantage of about 12:1.

29. The system of claim 25 wherein said float is concave.
30. The system of claim 25 wherein said float is hollow.
31. The system of claim 25 wherein said float is plastic.
32. The system of claim 25 wherein said float is buoyant.
33. A system for using wave energy to compress air and produce electricity, said system comprising:
 a) an upwardly and downwardly movable power transfer shaft contained in a sleeve guide, said shaft connected to a float disposed on waves providing motion to the shaft;
 b) a hollow body within which said power transfer shaft, sleeve guide and float are disposed;
 c) a piston contained in a chamber having one or more one-way air intake ports;
 d) a pivotally mounted lever connected at a first end to the piston and at an opposite end in contact relation with the power transfer shaft, with movement of the power transfer shaft causing the piston to compress air;
 e) a compressed air storage tank connected to the piston chamber by a one-way air valve through which compressed air enters the storage tank, said storage tank also having an air release valve; and f) a turbine in communication with the storage tank's air release valve, whereby the compressed air exits the storage tank and enters the turbine through the air release valve, generating electricity.

34. The system of claim 33 further comprising a water channel connected to said hollow body.

35. The system of claim 33 wherein said hollow body is pipe-like in shape and includes an upper opening through which said power transfer shaft emerges and retracts upon movement of said float.

36. The system of claim 33 wherein said hollow body includes a ramp beneath said float.

37. The system of claim 33 wherein said hollow body includes a side opening for water or air release.

38. The system of claim 33 further comprising a pair of cable wheels each connected to a side of said hollow body and having a cable disposed within said wheels, each cable having one end attached to said float and another end attached to a weight, said weight positioning said float.

39. The system of claim 33 wherein said lever pivots about a stationary pivot fulcrum.

40. The system of claim 33 wherein said stationary pivot fulcrum is located nearest to said piston.

41. The system of claim 33 wherein said lever has a mechanical advantage of about 12:1.

42. The system of claim 33 wherein said float is concave.

43. The system of claim 33 wherein said float is hollow.

44. The system of claim 33 wherein said float is plastic.

45. The system of claim 33 wherein said float is buoyant.

46. A system for using wave energy to compress air and produce electricity, said system comprising:

a) an upwardly and downwardly movable power transfer shaft having a rack and teeth, said shaft contained in a sleeve guide and said shaft connected to a float disposed on ocean waves providing motion to the shaft;

b) a first piston contained in a chamber having one or more one-way air intake ports;

c) a second opposed piston contained in a second chamber having one or more one-way air intake ports;

d) first and second gears having teeth disposed in meshing engagement with each other, said first gear being larger than said second gear wherein upon movement of said power transfer shaft, said first gear teeth are in meshing engagement with said power transfer shaft teeth, causing said first gear to rotate in one direction and said second gear to rotate in another;

e) a pair of crankshafts connected to either side of said second gear wherein upon upward movement of said power transfer shaft said second gear rotates in one direction causing movement of said first crankshaft and piston thus compression of air within said first piston chamber and upon downward movement of power transfer shaft said second gear rotates in an opposite direction causing movement of said second crankshaft and said second opposed piston thus compression of air within said second piston chamber;

f) a compressed air storage tank connected to said piston chambers by one-way air valves through which compressed air enters the storage tank, said storage tank also having an air release valve; and g) a turbine in communication with the storage tank's air release valve, whereby the compressed air exits the storage tank and enters the turbine through the valve, generating electricity.

47. The system according to claim 46 wherein said gears provide a mechanical advantage of 10:1.

* * * * *